United States Patent
Fu et al.

(10) Patent No.: US 9,108,862 B2
(45) Date of Patent: Aug. 18, 2015

(54) METHOD OF MAKING RUTILE TITANIUM DIOXIDE MICROSPHERES CONTAINING ELONGATED TIO$_2$-NANOCRYSTALLITES

(71) Applicant: Cristal Inorganic Chemicals Switzerland Ltd, Baar (CH)

(72) Inventors: Guoyi Fu, Ellicott City, MD (US); Mark B Watson, Kensington, MD (US)

(73) Assignee: Cristal Inorganic Chemicals Switzerland Ltd., Baar (CH)

(*) Notice: Subject to any disclaimer, the term of this patent is extended or adjusted under 35 U.S.C. 154(b) by 108 days.

(21) Appl. No.: 13/842,608

(22) Filed: Mar. 15, 2013

(65) Prior Publication Data
US 2014/0272416 A1    Sep. 18, 2014

(51) Int. Cl.
```
C01G 23/02      (2006.01)
C01G 23/047     (2006.01)
C01G 23/053     (2006.01)
B82Y 30/00      (2011.01)
```
(52) U.S. Cl.
CPC ............ *C01G 23/0536* (2013.01); *B82Y 30/00* (2013.01); *C01G 23/026* (2013.01); *C01G 23/047* (2013.01); *C01G 23/053* (2013.01); *C01P 2002/72* (2013.01); *C01P 2004/03* (2013.01); *C01P 2004/04* (2013.01); *C01P 2004/32* (2013.01); *C01P 2004/45* (2013.01); *C01P 2004/62* (2013.01); *C01P 2004/64* (2013.01); *C01P 2006/12* (2013.01); *C01P 2006/14* (2013.01); *Y10T 428/2982* (2015.01)

(58) Field of Classification Search
CPC .... C01G 23/02; C01G 23/026; C01G 23/047; C01G 23/08; C01P 2004/32; C01P 2004/50; C01P 2004/54; C01P 2004/61
USPC .......................... 423/69, 70, 76, 85, 610, 611
See application file for complete search history.

(56) References Cited

U.S. PATENT DOCUMENTS

| | | | | |
|---|---|---|---|---|
| 5,173,386 A * | 12/1992 | Murasawa | ...................... | 430/84 |
| 8,932,556 B2 * | 1/2015 | Fu et al. | ......................... | 423/610 |
| 2005/0232851 A1* | 10/2005 | Prochazka et al. | ............ | 423/610 |
| 2010/0028252 A1* | 2/2010 | Torardi | ......................... | 423/610 |
| 2011/0059315 A1 | 3/2011 | Vakayil et al. | | |
| 2012/0132515 A1 | 5/2012 | Ohno | | |

(Continued)

FOREIGN PATENT DOCUMENTS

EP    1 785 398    5/2007

OTHER PUBLICATIONS

Haimin Zhang et al.: "Rutile TiO2 microspheres with exposed nano-acicular single crystals for dye-sensitized solar cells," Nano Research, vol. 4, No. 10, Oct. 23, 2011, pp. 938-947.

(Continued)

*Primary Examiner* — Holly Le
(74) *Attorney, Agent, or Firm* — Dunlap Codding, P.C.

(57) ABSTRACT

Rutile TiO$_2$ microspheres and microparticles in a botryoidal morphology which form from ordered acicular aggregates of elongated TiO$_2$ crystallites that resemble nano-sized flower bouquets and/or triangular funnels, and process for their preparation by thermally hydrolyzing a soluble TiO$_2$ precursor compound in aqueous solution in the presence of a morphology controlling agent selected from carboxylic acids and amino acids.

7 Claims, 3 Drawing Sheets

(56) References Cited

U.S. PATENT DOCUMENTS

2012/0208313 A1* 8/2012 Cao et al. .................... 438/71
2014/0271448 A1* 9/2014 Fu et al. ..................... 423/610

OTHER PUBLICATIONS

Han Y et al.: "Synthesis and optical properties of rutile TiO2 microspheres composed of radially aligned nanorods," Journal of Crystal Growth, Elsevier, Amsterdam, NL, vol. 295, No. 1, Sep. 15, 2006, pp. 50-53.

International Search Report and Written Opinion (PCT/IB2014/000955) Oct. 22, 2014.

Seare A. Berhe et al.: "Influence of Seeding and Bath Conditions in Hydrothermal Growth of Very Thin (~20 nm) Single-Crystalline Rutile TiO2 Nanorod Films," ACS Applied Materials & Interfaces, vol. 5, No. 4. Feb. 27, 2013, pp. 1181-1185.

B.Dittert et al., Phase content controlled $TiO_2$ nanoparticles using the MicroJetReactor technology, Journal of the European Ceramic Society, 2011, 2475-2480, 31, Elsevier, Amsterdam, Netherlands.

J. Zhang et al., Hydrothermal-hydrolysis synthesis and photocatalytic properties of nano-$TiO_2$ with an adjustable crystalline structure, Journal of Hazardous Materials, 2010, 617-622, 176, Elsevier, Amsterdam, Netherlands.

* cited by examiner

METHOD OF MAKING RUTILE TITANIUM DIOXIDE MICROSPHERES CONTAINING ELONGATED TIO$_2$-NANOCRYSTALLITES

BACKGROUND OF THE INVENTION

The presently described and claimed inventive concept(s) relates to a novel chemical structure comprising rutile titanium dioxide (TiO$_2$) microspheres which are formed by aggregation of funnel-shaped rutile nanoparticles in which the broader dimension of the funnels assemble during hydrolysis to become the outer surface of the microspheres. More particularly, ordered aggregates of such microspheres further aggregate to resemble a larger botryoidal morphology.

Titanium dioxide (TiO$_2$) is known as a typical solid compound having photocatalytic activity and having utility in electronic, photovoltaic and photonic applications. Rutile and anatase crystal forms are known as major crystal forms of TiO$_2$ which display higher chemical stability and larger refractive indices than those of amorphous TiO$_2$. It has also been recognized that TiO$_2$ particles having a high degree of crystallinity can exhibit a desirable level of photocatalytic activity.

U.S. Patent Publication No. 2012/0132515, for example, describes rutile TiO$_2$ nanoparticles wherein each has an exposed crystal face, making the nanoparticles useful as a photocatalyst and oxidation catalyst. The TiO$_2$ nanoparticles are produced by subjecting a titanium compound to a hydrothermal treatment in an aqueous medium in the presence of a hydrophilic polymer, which is polyvinylpyrrolidone. The titanium compound, when hydrothermally treated in an aqueous medium, generally gives a rod-like crystal of rutile titanium dioxide having (110) and (111) faces. However, when hydrothermally treated in an aqueous medium in the presence of polyvinylpyrrolidone, the rod-like crystal which results exhibits a novel exposed crystal face (001). It is noted that the hydrophilic polymer acts as a steric stabilizer or capping agent to thereby prevent aggregation of the rod-like crystals of rutile titanium dioxide.

The need exists for improved methods for producing novel types of rutile titanium dioxide (TiO$_2$) nano- and microparticles which have high surface areas, e.g., in the range of from 120 m$^2$/g to 160 m$^2$/g, and high refractive indices for improved UV blocking capability and which demonstrate high performance levels in catalysis, e.g., biomass conversion, and in electronic applications, such as lithium ion batteries and fuel cells.

SUMMARY OF THE INVENTION

The described and claimed inventive concepts(s) comprise, in one embodiment, a method for preparing a novel form of rutile TiO$_2$ nanoparticles which are ordered acicular aggregates of elongated TiO$_2$ crystallites. The elongated TiO$_2$ crystallites are rod-like, e.g., slender and/or needle-like, having a thickness of from 3 nm to 5 nm and a length which can vary from 20 nm up to 50 nm, although longer and shorter lengths may also be present. However, the elongated TiO$_2$ crystallites assemble together during the process in a manner which results in ordered acicular aggregates that resemble nano-sized flower bouquets or triangular funnels. By controlling the hydrolysis conditions according to the inventive concept(s) described herein, the nano-sized flower bouquets or triangular funnel-shaped nanoparticles further aggregate into somewhat larger spherical structures, i.e., microspheres, having a diameter of from 1 to 2 microns. The particles aggregate in such a manner that the broader ends of the funnel-shaped particles become the outer surfaces of the microspheres where the tips of the funnels join, i.e., become assembled together, at the center of the microspheres.

The method for preparing the microspheres comprises:

(a) forming an aqueous solution of a soluble titanium compound at a titanium concentration of from 0.5 to 1.0 moles per liter;

(b) introducing a morphology controlling agent selected from an α-hydroxy carboxylic acid of the formula R—CH(OH)COOH, an α-hydroxy carboxamide of the formula R—CH(OH)CONH$_2$ or an α-amino acid of the formula R—CH(NH$_2$)COOH, wherein R is an alkane, alkene, alkyne, arene, or cycloalkane group having 4 or fewer carbon atoms, into the solution at an acid- or carboxamide-to-titanium molar ratio of from 0.02 to 0.2 while simultaneously heating the solution to a temperature in the range of from 75° C. to 80° C. with constant stirring;

(c) maintaining the stirred solution at a temperature in the range of from 75° C. to 80° C. for a period of from one to 3 hours;

(d) elevating the temperature of the stirred solution to a value of from 100° C. to the refluxing temperature and maintaining said temperature for a period of from 2 hours to 4 hours to form a reaction product;

(e) optionally neutralizing the reaction mixture which results from step (e);

(f) cooling the reaction mixture to room or ambient temperature; and (h) separating and drying the reaction product.

The reaction product can then be calcined. Calcining, which can be adjusted over a wide range for time and temperature, operates to enhance the properties of the resulting nanoparticles by expanding or opening the pore structure and/or increasing the refractive index.

The morphology controlling agent is selected from lactic acid (CH$_3$CH(OH)COOH); 2-hydroxybutyric acid (C$_2$H$_5$CH(OH)COOH); 2-hydroxypentanoic acid (C$_3$H$_7$CH(OH)COOH); 2-Hydroxyhexanoic acid (C$_4$H$_9$CH(OH)COOH); 2-Hydroxyisocaproic acid (CH$_3$CH(CH$_3$)CH$_2$CH(OH)COOH); alanine (CH$_3$CH(NH$_2$)COOH); valine (CH$_3$CH(CH$_3$)CH(NH$_2$)COOH); norvaline (C$_3$H$_7$CH(NH$_2$)COOH); isoleucine (C$_2$H$_5$CH(CH$_3$)CH(NH$_2$)COOH); leucine (CH$_3$CH(CH$_3$)CH$_2$CH(NH$_2$)COOH); and norleucine (C$_4$H$_9$CH(NH$_2$)COOH) and mixtures thereof.

The soluble titanium compound is selected from titanium oxychloride (TiOCl$_2$), titanium oxybromide (TiOBr$_2$), titanium oxyiodide (TiOI$_2$), titanium oxynitrate (TiO(NO$_3$)$_2$), titanium trichloride (TiCl$_3$), titanium tribromide (TiBr$_3$), titanium oxalate (Ti$_2$(C$_2$O$_4$)$_3$), potassium hexafluorotitanate (K$_2$TiF$_6$), ammonium hexafluorotitanate ((NH$_4$)$_2$TiF$_6$), potassium titanyloxolate (K$_2$TiO(C$_2$O$_4$)$_2$), ammonium titanyloxolate ((NH$_4$)$_2$TiO(C$_2$O$_4$)$_2$), titanium bis(ammonium lactate)dihydroxide ([CH$_3$CH(O)COONH$_4$]$_2$Ti(OH)$_2$) and mixtures thereof.

According to another embodiment, the described and claimed inventive concept(s) relates to a method for preparing rutile TiO$_2$ particles which comprise structures in a botryoidal morphology having a size in the range of from 10 to 20 microns. The botryoidal structures, also being aggregates of elongated TiO$_2$ crystallites having a thickness of from 3 nm to 5 nm, are formed by introducing TiO$_2$ seeds into the stirred solution at a seed-to-TiO$_2$ molar ratio of from 0.0005 to 0.0015 following introduction of the morphology controlling agent. The stirred solution is then maintained at a temperature in the range of from 75° C. to 80° C. for a period of from one to 3 hours, and the process is further carried out as described above.

The described and claimed inventive concept(s) include, in other embodiments, the microspheres and the botryoidal particles produced by the described processes.

DETAILED DESCRIPTION OF THE INVENTION

Figure 1:
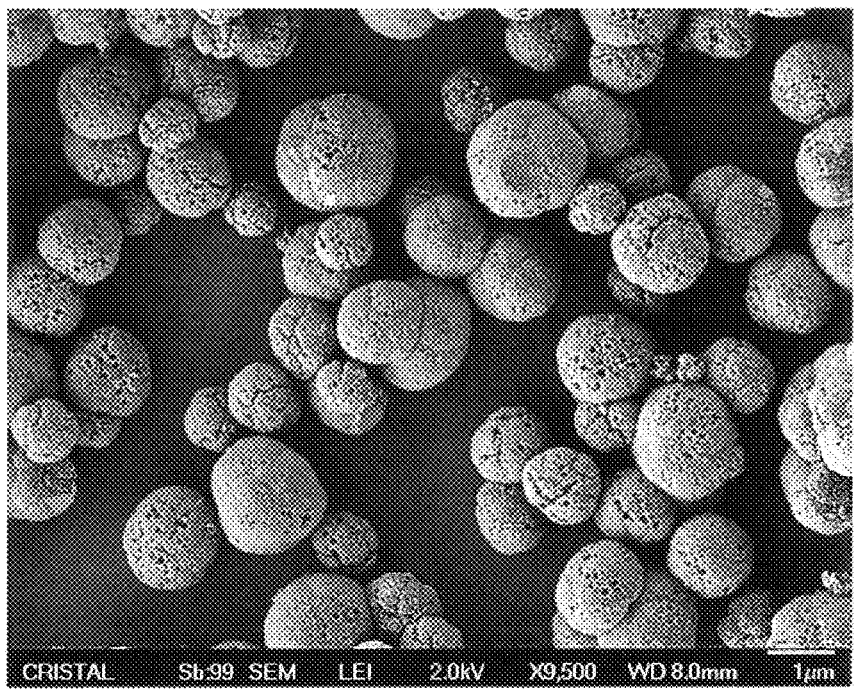
FIG. 1 is an SEM (Scanning Electron Microscopy) image (9500 magnification) of spherical-shaped rutile $TiO_2$ microparticles according to the invention.

The described and claimed inventive concepts(s) comprise, in one embodiment, a method for preparing a novel form of rutile $TiO_2$ nanoparticles which are ordered acicular aggregates of elongated $TiO_2$ crystallites. The elongated $TiO_2$ crystallites are rod-like and have a thickness of from 3 nm to 5 nm and a length which can vary generally from 20 nm up to 50 nm. However, the elongated $TiO_2$ crystallites assemble together during the process in a manner which results in ordered acicular aggregates that resemble nano-sized flower bouquets or triangular funnels. By controlling the hydrolysis conditions according to the inventive concept(s) described and claimed herein, the nano-sized flower bouquets or triangular funnel-shaped nanoparticles further aggregate into somewhat larger spherical structures, i.e., microspheres, having a diameter of from 1 to 2 microns. Detailed examination under an electron microscope confirms that the microspheres are indeed formed by aggregation of the funnel-shaped nanoparticles. The microspheres can be seen in FIGS. 1 and 2. The hydrolysis conditions are controlled in such a manner that the nanoparticles aggregate so that the broader ends of the funnel-shaped particles become the outer surfaces of the microspheres, and the tips of the funnels join, i.e., assemble together, at the center of the microspheres. The structure observed for the microspheres indicates a large number of rutile nano-rods with various lengths radiating outwardly from the center of the spherical structures with each of the rods aligning at an angle normal to the surface of the spheres.

The novel rutile $TiO_2$ microspheres are prepared by thermally hydrolyzing a soluble $TiO_2$ precursor compound, or a mixture of such compounds, in aqueous solution in the presence of a morphology controlling agent, or a mixture of morphology controlling agents, under specific conditions. The process is a wet chemical hydrolysis method in which the structure of the microspheres is controlled by controlling the structure of the nano-sized flower bouquets or triangular funnel-shaped nanoparticles. A morphology controlling agent, or a mixture of morphology controlling agents, is used that is selected from (i) an α-hydroxy carboxylic acid of the formula R—CH(OH)COOH, (ii) an α-hydroxy carboxamide of the formula R—CH(OH)CONH$_2$, or (iii) an α-amino acid of the formula R—CH(NH$_2$)COOH, wherein R is an alkane, alkene, alkyne, arene, or cycloalkane group having 4 or fewer carbon atoms.

The process begins by forming an aqueous solution of a soluble titanium compound at a titanium concentration of from 0.1 to 1.5 moles per liter, but preferably 0.5 to 1.0 moles per liter, optionally in the presence of a mineral acid. Distilled or deionized water can be used to form the aqueous solution, and a mineral acid, e.g., hydrochloric acid (HCl), can be introduced as needed for controlling the rate of hydrolysis.

The morphology controlling agent, or a mixture thereof, is introduced into the solution at an acid- or carboxamide-to-titanium molar ratio of from 0.02 to 0.4, although best results have been observed when the ratio is from 0.02 to 0.2. The solution is simultaneously heated to a temperature in the range of from 75° C. to 80° C. with constant stirring.

The temperature of the stirred solution is next elevated to a value of from 100° C. to the refluxing temperature and maintained at that level for a period of from 2 hours to 4 hours during which time a reaction product is formed. The solution, i.e., reaction mixture, is then cooled to room or ambient temperature, and, optionally, it can be neutralized, e.g., pH of 5 to 8, with introduction of a base, such as an ammonia solution or a sodium hydroxide solution. The reaction product is then separated by filtration and washed with dionized water to remove salts generated during hydrolysis. The resulting filter cake can then be dried in an oven or re-slurried with water and spray dried.

As noted above, the reaction product can then be calcined as desired over a wide range of time and temperature to enhance the properties of the resulting nanoparticles, such as by expanding or opening the pore structure and/or increasing the refractive index.

For best results the soluble titanium precursor compound is selected from titanium oxychloride ($TiOCl_2$), titanium oxybromide ($TiOBr_2$), titanium oxyiodide ($TiOI_2$), titanium oxynitrate ($TiO(NO_3)_2$), titanium trichloride ($TiCl_3$), titanium tribromide ($TiBr_3$), titanium oxalate ($Ti_2(C_2O_4)_3$), potassium hexafluorotitanate ($K_2TiF_6$), ammonium hexafluorotitanate (($NH_4)_2TiF_6$), potassium titanyloxolate ($K_2TiO(C_2O_4)_2$), ammonium titanyloxolate (($NH_4)_2TiO(C_2O_4)_2$), and titanium bis(ammonium lactate)dihydroxide ($[CH_3CH(O)COONH_4]_2Ti(OH)_2$). Other commercially available soluble titanium precursor compounds can be deployed in the process and produce satisfactory results and, although not specifically named herein, they are embraced within the described and claimed inventive concept(s).

As noted above, morphology controlling agents, or mixtures thereof, for carrying out the inventive concept(s) include (i) α-hydroxy carboxylic acids of the formula R—CH(OH)COOH, (ii) α-hydroxy carboxamides of the formula R—CH(OH)CONH$_2$, and (iii) α-amino acids of the formula R—CH(NH$_2$)COOH, wherein R is an alkane, alkene, alkyne, arene, or cycloalkane group having 4 or fewer carbon atoms. Examples of such morphology controlling agents include, but are not limited to, lactic acid ($CH_3CH(OH)COOH$); 2-hydroxybutyric acid ($C_2H_5CH(OH)COOH$); 2-hydroxypentanoic acid ($C_3H_7CH(OH)COOH$); 2-Hydroxyhexanoic acid ($C_4H_9CH(OH)COOH$); 2-Hydroxyisocaproic acid ($CH_3CH(CH_3)CH_2CH(OH)COOH$); alanine ($CH_3CH(NH_2)COOH$); valine ($CH_3CH(CH_3)CH(NH_2)COOH$); norvaline ($C_3H_7CH(NH_2)COOH$); isoleucine ($C_2H_5CH(CH_3)CH(NH_2)COOH$); leucine ($CH_3CH(CH_3)CH_2CH(NH_2)COOH$); and norleucine ($C_4H_9CH(NH_2)COOH$) and mixtures thereof.

It has also been discovered according to the inventive concept(s) described herein that the hydrolysis conditions can be further adjusted to produce even larger aggregates of about 10 to 20 microns in size which exhibit a botryoidal morphology or texture. A botryoidal texture is one in which the particle has a globular external form resembling, for example, a bunch of grapes. The botryoidal structures, also being aggregates of the elongated $TiO_2$ crystallites, form when $TiO_2$ seeds are introduced into the stirred solution at a seed-to-$TiO_2$ molar ratio of from 0.0005 to 0.0015 following introduction of the morphology controlling agent. The stirred solution is then maintained at a temperature in the range of from 75° C. to 80° C. for a period of from one to 3 hours, and the process is further carried out as described above. The rutile $TiO_2$ microspheres and the botryoidal particles become denser and their pore volumes become lower in comparison with the funnel-shaped triangular nanoparticles, although the powder specific surface areas for the particle varieties are similar to one another, i.e., in the range from 120 $m^2$/g to 160 $m^2$/g. Typical pore volumes for the microspheres and botryoidal particles are in the range of from 0.1 $cm^3$/g-0.3 $cm^3$/g.

EXAMPLES

The present invention will be illustrated in further detail with reference to the working examples which follow and FIGS. 1-8. It should be noted, however, that these examples should not be construed to limit the scope of the described and claimed inventive concept(s).

Example 1

Preparation of $TiO_2$ Microspheres Using Carboxylic Acids 1,255 g of deionized water, 6.6 g lactic acid (85% solution from Alfa Aesar), 97 g HCl solution (37% from Fisher Scientific), and 397 g of titanium oxychloride solution (25.2% in $TiO_2$, from Millennium Inorganic Chemicals) were mixed together in a heated reactor equipped with a glass condenser and an overhead stirrer. While being constantly stirred, the mixture was heated to 75° C., and the hydrolysis reaction was maintained at 75° C. for 2 hours. The reaction temperature was then increased to 103° C., and that temperature was maintained for 4 hours. The hydrolysis was essentially complete at this stage.

The resulting reaction mixture was then cooled to room temperature and transferred to a different container where the particles formed were allowed to settle for a few hours. After essentially all of the particles were observed to have settled to the bottom of the container, the mother liquor, i.e., liquid reaction medium, was removed and about the same volume of fresh deionized water was added to the container. The reaction mixture was then stirred to re-slurry the particles, and then the pH of the slurry was increased to a value of about 7 by slow addition of an ammonia solution (~29%, Fisher Scientific). The particles comprising the reaction product were then separated from the liquid reaction mixture using a Buchner filter and washed with deionized water until the conductivity of the filtrate was lowered to about 500 μS/cm. The wet filter cake sample was then stored as a slurry by re-slurring the filter cake with a small amount of deionized water. The powder form of the sample was obtained by drying the slurry sample in an oven overnight at 90° C. X-ray Diffraction (XRD) measurement on the powder sample indicates that the sample contained 100% rutile with crystallite size of 7.6 nm. BET measurement on the powder sample showed that the powder had a specific surface area of 122 $m^2$/g and a pore volume of 0.1 $cm^3$/g.

SEM images of the slurry sample are shown in FIG. 1 at a magnification of 9,500 where the spherical microspheres can be observed. Enlarged microspheres can be seen more clearly in FIG. 2 at a magnification of 50,000.

Figure 2:
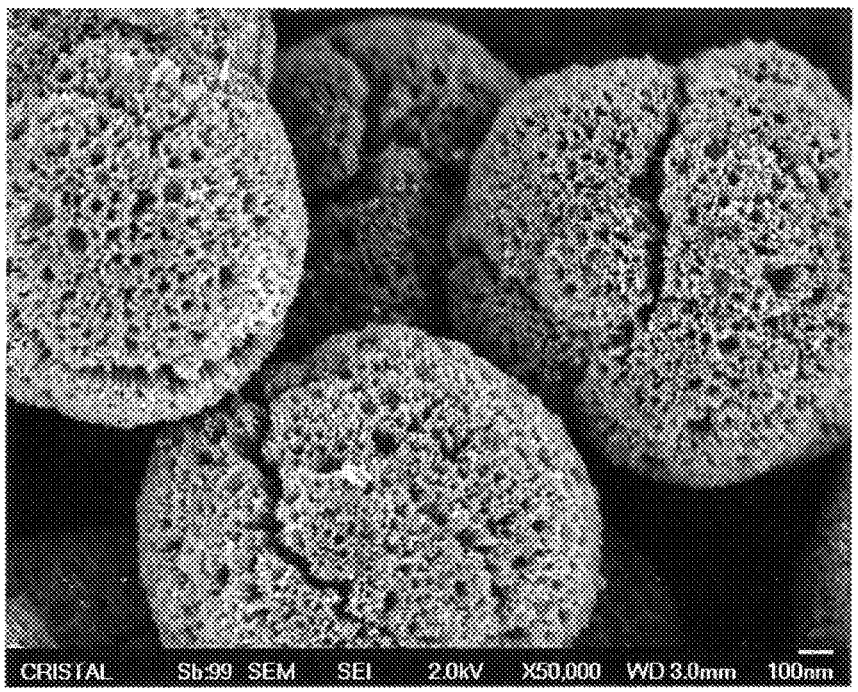
FIG. 2 is an enlarged SEM image (50,000 magnification) which illustrates in more detail the spherical-shaped rutile $TiO_2$ microparticles according to the invention.

The $TiO_2$ microspheres shown in FIGS. 1 and 2 can be calcined, which can be adjusted for time and temperature, to enhance the properties of the resulting microparticles by expanding or opening the pore structure and/or increasing the refractive index.

Example 2

Preparation of Botryoidal Micro-Particles Using Carboxylic

Figure 3:
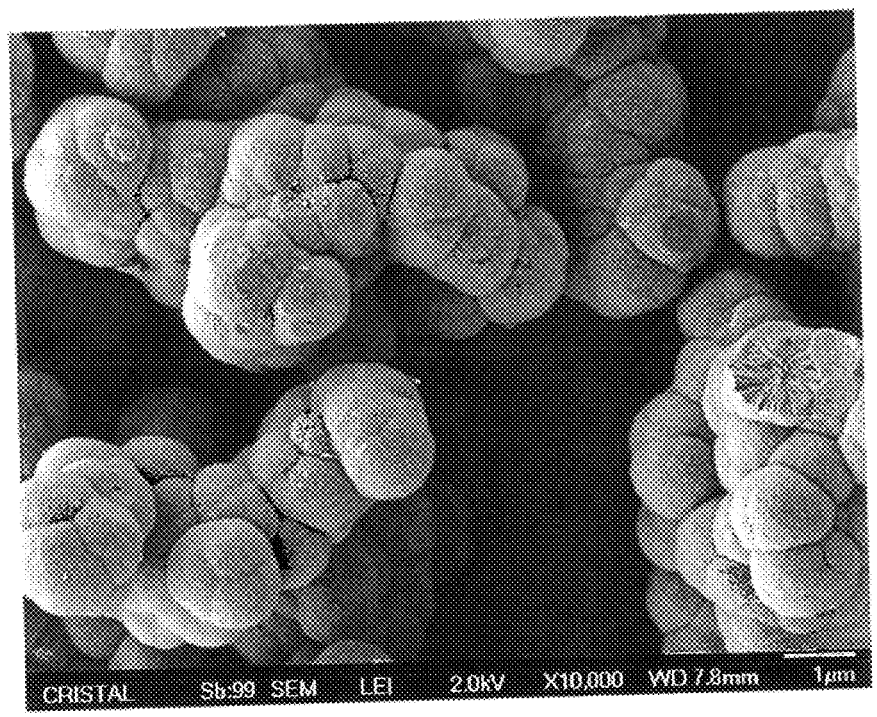
FIG. 3 is an SEM image (10,000 magnification) which illustrates spherical-shaped rutile $TiO_2$ microparticles arranged in structures which resemble a botryoidal morphology according to the invention.
Figure 4:
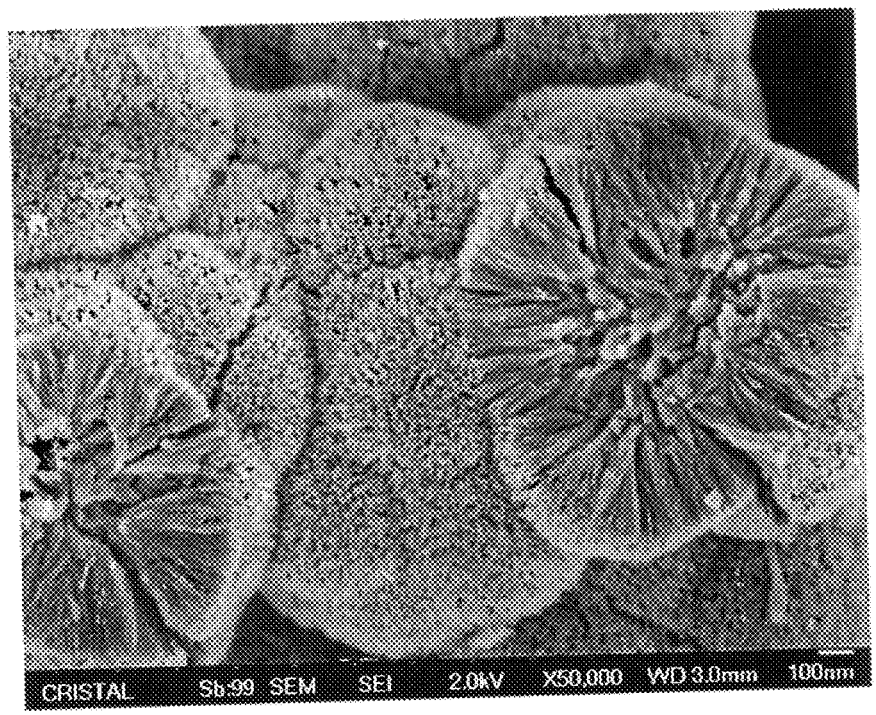
FIG. 4 is an enlarged SEM image (50,000 magnification) which illustrates the botryoidal morphology according to the invention in more detail.
Figure 5:
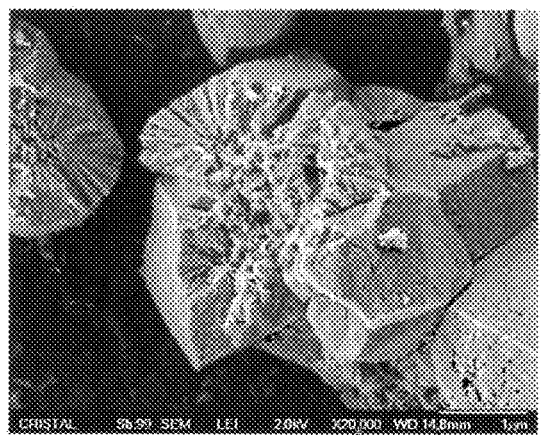
FIGS. 5 and 6 are SEM images of rutile $TiO_2$ microparticles prepared by thermal hydrolysis according to Example 3, but without benefit of a morphology controlling agent.
Figure 6:
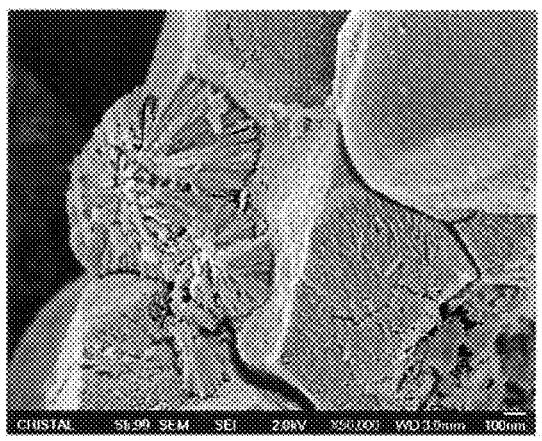

The same procedure was followed as was followed in Example 1, except that 13.2 g of lactic acid (85% solution from Alfa Aesar) was added. In addition, the final hydrolysis temperature was maintained at 95° C. for 4 hours instead of 103° C. SEM images of the sample are shown in FIG. 3 at a magnification of 10,000. A botryoidal texture can be observed in which the particle has a globular external form resembling, for example, a bunch of grapes. FIG. 4 shows an enlarged SEM image (50,000 magnification) which illustrates the botryoidal morphology in more detail.

XRD measurement of the sample confirmed that the sample contained 100% rutile $TiO_2$ with a crystallite size of 7.8 nm. BET measurement showed a specific area of 161 $m^2$/g and a pore volume of 0.12 $cm^3$/g.

Comparative Example 3

Hydrolysis without a Morphology Controlling Agent(s)

The same procedure was followed as was followed for Example 1, except that no organic acids (morphology controlling agent) were added during the procedure. SEM images of the sample can be seen in FIGS. 5 and 6. XRD measurement showed that the sample contained 100% rutile $TiO_2$, however, the SEM images show clearly that the sample prepared by thermal hydrolysis without a morphology controlling agent has a different morphology than the microsphere and botryoidal particle samples shown in FIGS. 1-4 in which a morphology controlling agent was used.

What is claimed is:
1. A method for preparing rutile $TiO_2$ particles which comprise generally spherical structures in the range of from 1 to 2 microns in diameter, said structures being aggregates of elongated $TiO_2$ crystallites, said method comprising:
 (a) forming an aqueous solution of a soluble titanium compound at a titanium concentration of from 0.5 to 1.0 moles per liter;
 (b) introducing a morphology controlling agent selected from the group consisting of an α-hydroxy carboxylic acid of the formula R—CH(OH)COOH, an α-hydroxy carboxamide of the formula R—CH(OH)$CONH_2$ or an α-amino acid of the formula R—CH($NH_2$)COOH, wherein R is an alkane, alkene, alkyne, arene, or cycloalkane group having 4 or fewer carbon atoms, into the solution at an acid- or carboxamide-to-titanium molar ratio of from 0.02 to 0.2 while simultaneously heating the solution to a temperature in the range of from 75° C. to 80° C. with constant stirring;
 (c) maintaining the stirred solution at a temperature in the range of from 75° C. to 80° C. for a period of from one to 3 hours;

(d) elevating the temperature of the stirred solution to a value of from 100° C. to the refluxing temperature and maintaining said temperature for a period of from 2 hours to 4 hours to form a reaction product;

(e) optionally neutralizing the stirred solution which results from step (d);

(f) cooling the stirred solution to room or ambient temperature; and (h) separating and drying the reaction product.

2. The method of claim 1 wherein said elongated $TiO_2$ crystallites have a length of from 20 nm to 50 nm and a thickness of from 3 nm to 5 nm.

3. The method of claim 2 wherein one of the ends from each of said elongated $TiO_2$ crystallites assemble into a cluster whereby the opposite ends of each of said crystallites extend outwardly and terminate at an angle normal to the outer surface forming said spherical structure.

4. The method of claim 1 wherein said morphology controlling agent is selected from lactic acid ($CH_3CH(OH)COOH$); 2-hydroxybutyric acid ($C_2H_5CH(OH)COOH$); 2-hydroxypentanoic acid ($C_3H_7CH(OH)COOH$); 2-Hydroxyhexanoic acid ($C_4H_9CH(OH)COOH$); 2-Hydroxyisocaproic acid ($CH_3CH(CH_3)CH_2CH(OH)COOH$); alanine ($CH_3CH(NH_2)COOH$); valine ($CH_3CH(CH_3)CH(NH_2)COOH$); norvaline ($C_3H_7CH(NH_2)COOH$); isoleucine ($C_2H_5CH(CH_3)CH(NH_2)COOH$); leucine ($CH_3CH(CH_3)CH_2CH(NH_2)COOH$); and norleucine ($C_4H_9CH(NH_2)COOH$) and mixtures thereof.

5. The method of claim 1 wherein said soluble titanium compound is selected from titanium oxychloride ($TiOCl_2$), titanium oxybromide ($TiOBr_2$), titanium oxyiodide ($TiOI_2$), titanium oxynitrate ($TiO(NO_3)_2$), titanium trichloride ($TiCl_3$), titanium tribromide ($TiBr_3$), titanium oxalate ($Ti_2(C_2O_4)_3$), potassium hexafluorotitanate ($K_2TiF_6$), ammonium hexafluorotitanate ($(NH_4)_2TiF_6$), potassium titanyloxolate ($K_2TiO(C_2O_4)_2$), ammonium titanyloxolate ($(NH_4)_2TiO(C_2O_4)_2$), titanium bis(ammonium lactate) dihydroxide ($[CH_3CH(O)COONH_4]_2Ti(OH)_2$) and mixtures thereof.

6. The method of claim 4 wherein said soluble titanium compound is selected from titanium oxychloride ($TiOCl_2$), titanium oxybromide ($TiOBr_2$), titanium oxyiodide ($TiOI_2$), titanium oxynitrate ($TiO(NO_3)_2$), titanium trichloride ($TiCl_3$), titanium tribromide ($TiBr_3$), titanium oxalate ($Ti_2(C_2O_4)_3$), potassium hexafluorotitanate ($K_2TiF_6$), ammonium hexafluorotitanate ($(NH_4)_2TiF_6$), potassium titanyloxolate ($K_2TiO(C_2O_4)_2$), ammonium titanyloxolate ($(NH_4)_2TiO(C_2O_4)_2$), titanium bis(ammonium lactate) dihydroxide ($[CH_3CH(O)COONH_4]_2Ti(OH)_2$) and mixtures thereof.

7. The method of claim 6 wherein said morphology controlling agent is lactic acid ($CH_3CH(OH)COOH$), and said soluble titanium compound is titanium oxychloride ($TiOCl_2$).

* * * * *